United States Patent
Kim et al.

(10) Patent No.: US 9,829,670 B2
(45) Date of Patent: Nov. 28, 2017

(54) LENS MODULE, METHOD OF MANUFACTURING THE SAME, AND CAMERA MODULE INCLUDING THE SAME

(71) Applicant: SAMSUNG ELECTRO-MECHANICS CO., LTD., Suwon-Si (KR)

(72) Inventors: Duck Hun Kim, Suwon-Si (KR); Kwang Yun Choi, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 97 days.

(21) Appl. No.: 14/455,832

(22) Filed: Aug. 8, 2014

(65) Prior Publication Data

US 2015/0301303 A1   Oct. 22, 2015

(30) Foreign Application Priority Data

Apr. 18, 2014   (KR) ........................ 10-2014-0046758

(51) Int. Cl.
*G02B 13/16* (2006.01)
*H04N 5/225* (2006.01)
*G02B 7/02* (2006.01)
*G02B 7/00* (2006.01)
*B32B 37/12* (2006.01)
*B32B 37/14* (2006.01)
(Continued)

(52) U.S. Cl.
CPC .......... *G02B 7/023* (2013.01); *B32B 37/1292* (2013.01); *B32B 37/142* (2013.01); *B32B 37/18* (2013.01); *G02B 5/003* (2013.01); *G02B 7/003* (2013.01); *G02B 7/02* (2013.01); *G02B 7/021* (2013.01); *H04N 5/2254* (2013.01); *B32B 2307/412* (2013.01); *B32B 2551/00* (2013.01)

(58) Field of Classification Search
CPC .......... G02B 7/023; G02B 5/003; G02B 7/02; G02B 7/021; G02B 7/003; B32B 37/18; B32B 37/142; B32B 37/1292; B32B 2551/00; B32B 2307/412; H04N 5/2254
USPC .............. 348/335, 340, 345, 348, 350, 352; 396/529, 530
See application file for complete search history.

(56) References Cited

U.S. PATENT DOCUMENTS 8,300,332 B2   10/2012   Campbell
8,526,129 B2   9/2013   Hirata et al.
(Continued)

FOREIGN PATENT DOCUMENTS

CN   1834711 A   9/2006
CN   101983348 A   3/2011
(Continued)

OTHER PUBLICATIONS

Extended European Search Report dated Aug. 19, 2015, in counterpart European Application No. 14275166.8 (7 pages, in English).
(Continued)

*Primary Examiner* — Yogesh Aggarwal
(74) *Attorney, Agent, or Firm* — NSIP Law

(57) ABSTRACT

A lens module may include a lens inserted into a lens barrel. One surface of the lens facing one surface of the lens barrel in an optical axis direction may be disposed in a stress-free state, and the lens is movable relative to the lens barrel to allow optical axes of lenses to be aligned with each other.

41 Claims, 18 Drawing Sheets

(51) Int. Cl.
*B32B 37/18* (2006.01)
*G02B 5/00* (2006.01)

(56) References Cited

U.S. PATENT DOCUMENTS

| | | | |
|---|---|---|---|
| 2004/0258976 A1* | 12/2004 | Nishizawa | H01M 8/2475 |
| | | | 396/301 |
| 2005/0063695 A1 | 3/2005 | Kameyama | |
| 2005/0168846 A1 | 8/2005 | Ye et al. | |
| 2008/0218882 A1* | 9/2008 | Takase | G02B 7/021 |
| | | | 359/822 |
| 2009/0002852 A1 | 1/2009 | Wang | |
| 2011/0063739 A1* | 3/2011 | Hirata | G02B 7/021 |
| | | | 359/819 |
| 2011/0157721 A1 | 6/2011 | Ohtake | |
| 2011/0235001 A1 | 9/2011 | Matsumoto | |
| 2012/0063017 A1 | 3/2012 | Song | |

FOREIGN PATENT DOCUMENTS

| | | |
|---|---|---|
| CN | 102109656 A | 6/2011 |
| CN | 102207599 A | 10/2011 |
| JP | 2009-251402 A | 10/2009 |
| JP | 2010-281992 A | 12/2010 |
| TW | 201221797 A1 | 6/2012 |

OTHER PUBLICATIONS

Taiwanese Office Action dated Dec. 1, 2016 in the corresponding Taiwanese Patent Application No. 103126518 (19 pages with English translation).

Chinese Office Action dated Feb. 23, 2017 in corresponding Chinese Patent Application No. 201410427709.X (32 pages with English translation).

* cited by examiner

A-A'

B-B'

'C'

LENS MODULE, METHOD OF MANUFACTURING THE SAME, AND CAMERA MODULE INCLUDING THE SAME

CROSS-REFERENCE TO RELATED APPLICATION

This application claims the benefit of Korean Patent Application No. 10-2014-0046758 filed on Apr. 18, 2014, with the Korean Intellectual Property Office, the disclosure of which is incorporated in its entirety herein by reference.

BACKGROUND

The present disclosure generally relates to a lens module, a method of manufacturing the same, and a camera module including the same.

A camera module provided in a portable electronic device allows light to pass through lenses so that an image sensor can collect light to form an image of a subject.

Here, an alignment process, a process of aligning optical axes of lenses to focus the lenses, should be performed in order to obtain a high resolution image.

In addition, in the case in which a plurality of lenses are provided in a camera module, optical axes of the respective lenses may be misaligned with each other. Therefore, the alignment of the optical axes of the plurality of lenses needs to be performed.

In the case of lens alignment, after the lenses have been inserted into a lens barrel, it is relatively difficult to move the lenses therewithin, such that it is difficult to align the optical axes of lenses with each other after their insertion into such a lens barrel.

SUMMARY

Some embodiments of the present disclosure may provide a lens module in which optical axes of lenses may be easily or accurately aligned with each other, a method of manufacturing the same, and a camera module including the same.

Some embodiments of the present disclosure may also provide a lens module able to be manufactured using a decreased or minimized number of processes and at a low cost, a method of manufacturing the same, and a camera module including the same.

In a lens module, a method of manufacturing the same, and a camera module including the same according to an exemplary embodiment of the present disclosure, a lens may be inserted into a lens barrel, one surface of the lens facing one surface of the lens barrel in an optical axis direction may be disposed in a stress-free state, and the lens may be moved relative to the lens barrel to allow optical axes of lenses to be aligned with each other.

In a lens module, a method of manufacturing the same, and a camera module including the same according to an exemplary embodiment of the present disclosure, a lens holder may be further provided, and the lens holder may be moved in a state in which the lens is closely adhered to and supported by the lens holder, to adjust positions of the lenses.

In a lens module, a method of manufacturing the same, and a camera module including the same according to an exemplary embodiment of the present disclosure, optical axes of lenses may be aligned with each other even in the case that a lens closest to an object is attached to the lens barrel in the same direction as a direction in which other lenses are disposed, and a manufacturing process may be reduced in complexity and manufacturing costs may be decreased.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
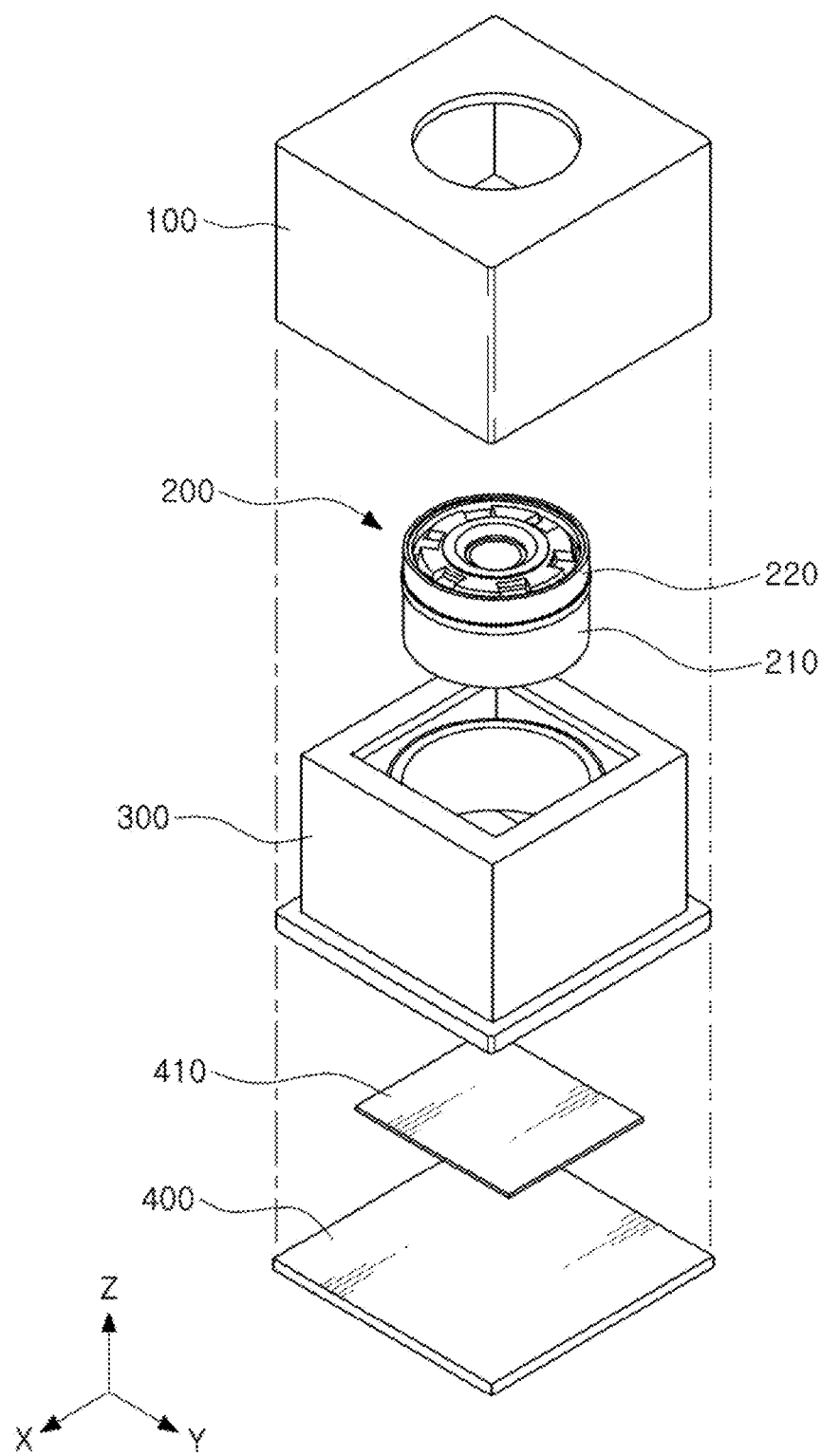
FIG. 1 is an exploded perspective view of a camera module according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Terms with respect to directions will be defined hereinafter for illustration purposes only. An optical axis direction (for example, a Z direction) refers to a vertical direction based on a lens barrel, and a horizontal direction (for example, an X-Y direction) refers to a direction perpendicular to the optical axis direction (for example, the Z direction).

FIG. 1 is an exploded perspective view of a camera module according to an exemplary embodiment of the present disclosure.

Referring to FIG. 1, a camera module according to an exemplary embodiment of the present disclosure may include a lens module 200, a housing 300, a case 100, an image sensor 410, and a substrate 400.

The lens module 200 may include a lens barrel 210 and lenses accommodated in the lens barrel 210.

The lens barrel 210 may have a hollow cylindrical shape so that the lenses may be accommodated therein, and the lenses may be provided or arranged in the lens barrel 210 to be centered on an optical axis.

A required number of lenses may be provided, depending on a design of the lens module 200, and a plurality of lenses may have optical characteristics such as identical or different reflective indices, respectively.

The lens module 200 may further include a lens holder 220 configured to align optical axes of the lenses with each other.

The lens holder 220 may move one or more lenses accommodated in the lens barrel 210 to align the optical axes of the lenses with each other.

This will be described below in detail with reference to FIGS. 5A through 5D.

The housing 300 may accommodate the lens module 200 therein, and may include the substrate 400 coupled to a lower portion thereof. The substrate 400 may be provided with the image sensor 410 mounted thereon.

The housing 300 may have a form in which it has an opening or hole in the optical axis direction (the Z direction) so that external light may pass therethrough and be collected on the image sensor 410.

The case 100 may be coupled to the housing 300 to enclose or cover an outer surface or an upper portion of the housing 300 and may serve to shield electromagnetic waves generated when the camera module is driven.

For example, when the camera module is driven, electromagnetic waves may be generated. In the case in which electromagnetic waves are discharged to the outside of the camera module, electromagnetic waves may have an influence on other electronic components such as a communication error or malfunction.

In the exemplary embodiment of the present disclosure, the case 100 may be formed of, for example, but not limited to, a metal to thereby be grounded to a ground pad provided on the substrate 400. Therefore, the case 100 may shield electromagnetic waves.

In addition, in the case in which the case 100 is formed as a plastic injection-molded product, a conductive paint may be applied onto an inner surface of the case 100 to shield from electromagnetic waves.

The conductive paint may be a conductive epoxy, but is not limited thereto. For example, various materials having conductivity may be used as the conductive paint. A conductive film or conductive tape may be attached to the inner surface of the case 100.

Figure 2:
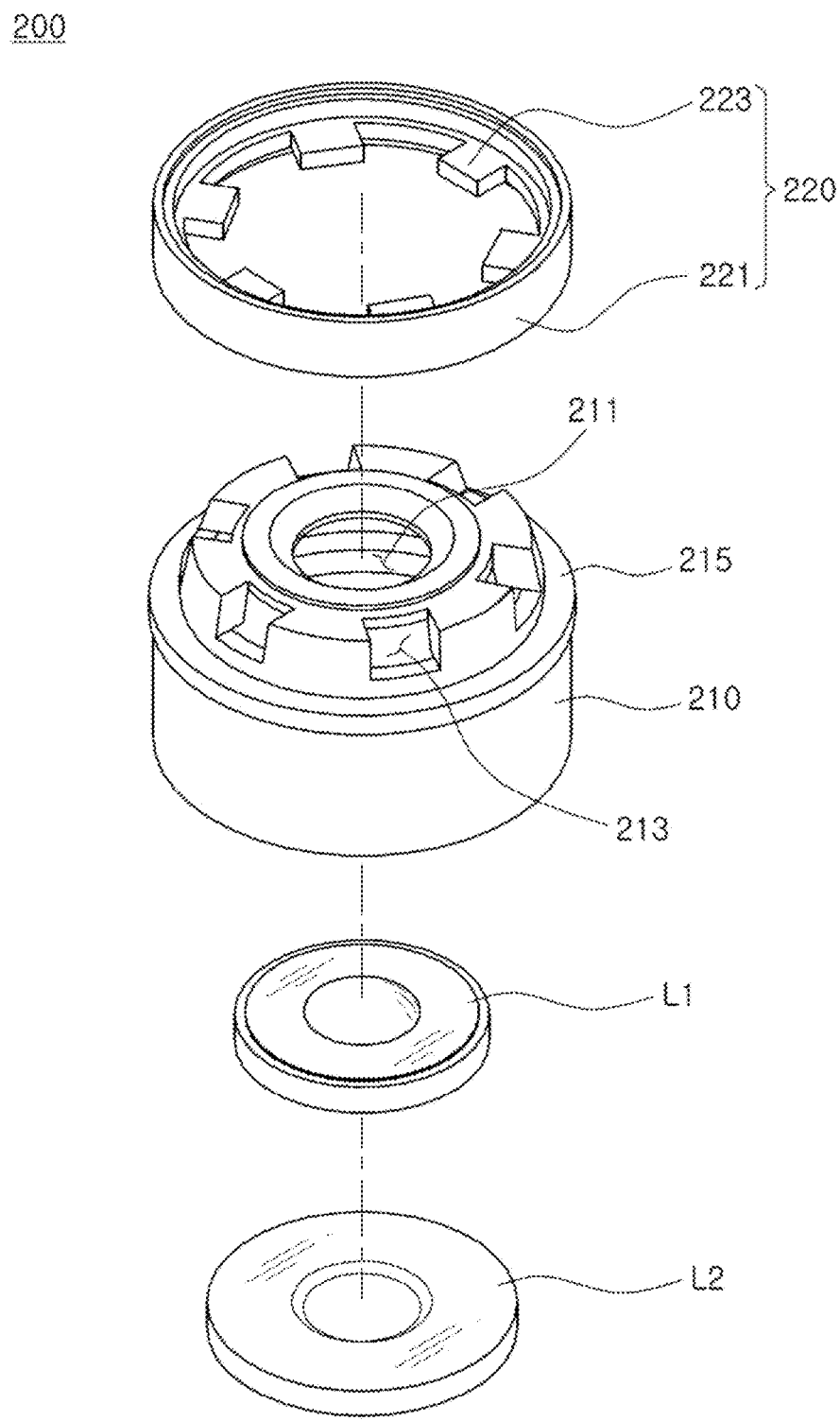
FIG. 2 is an exploded perspective view of a lens module according to an exemplary embodiment of the present disclosure.
Figure 3:
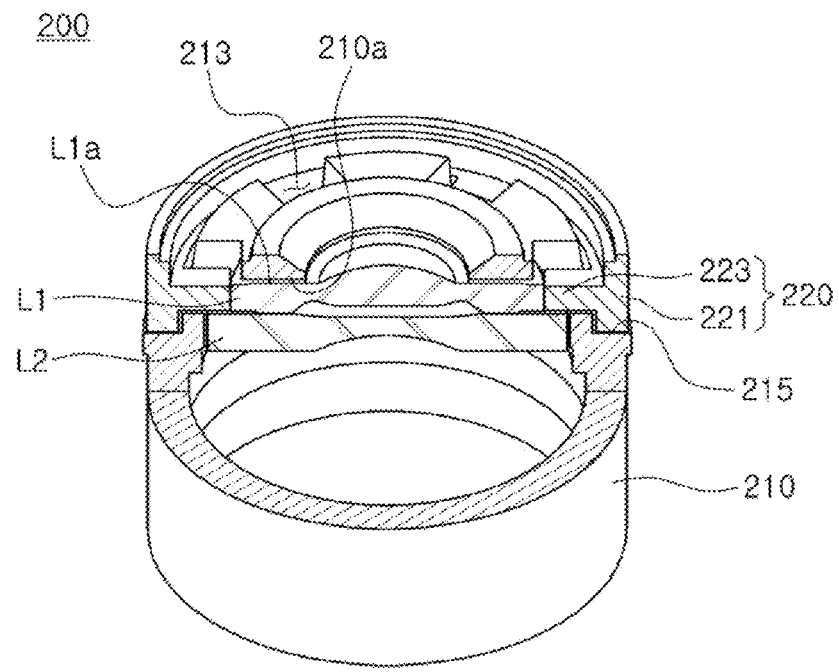
FIG. 3 is a partially cut-away perspective view of the lens module according to an exemplary embodiment of the present disclosure.

FIG. 2 is an exploded perspective view of a lens module 200 according to an exemplary embodiment of the present disclosure; and FIG. 3 is a partially cut-away perspective view of the lens module 200 according to an exemplary embodiment of the present disclosure.

Figure 4A:
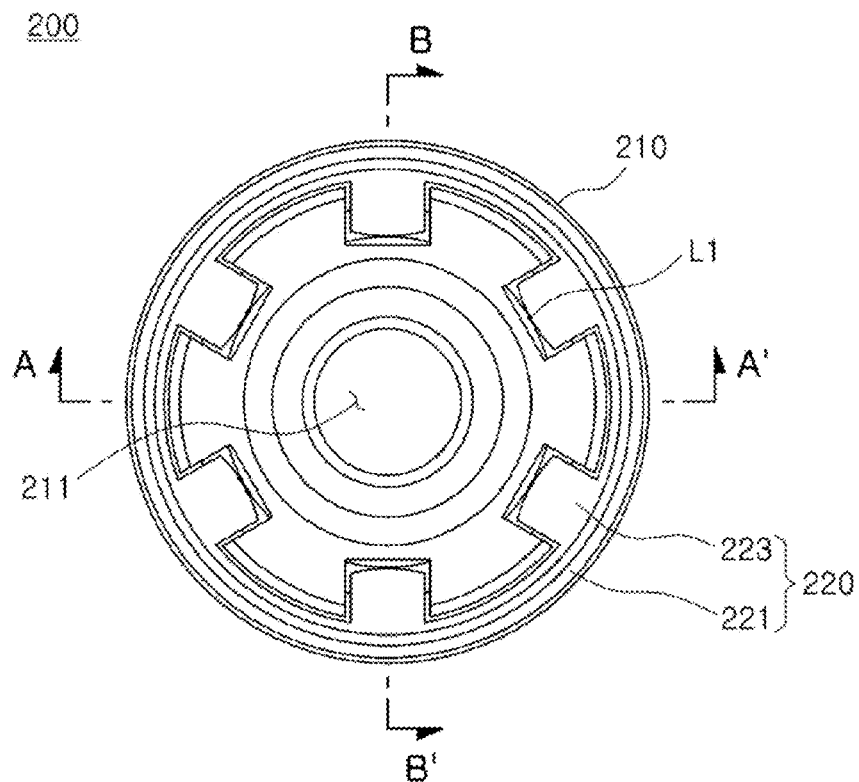
FIG. 4A is a plan view of the lens module according to an exemplary embodiment of the present disclosure.
Figure 4B:
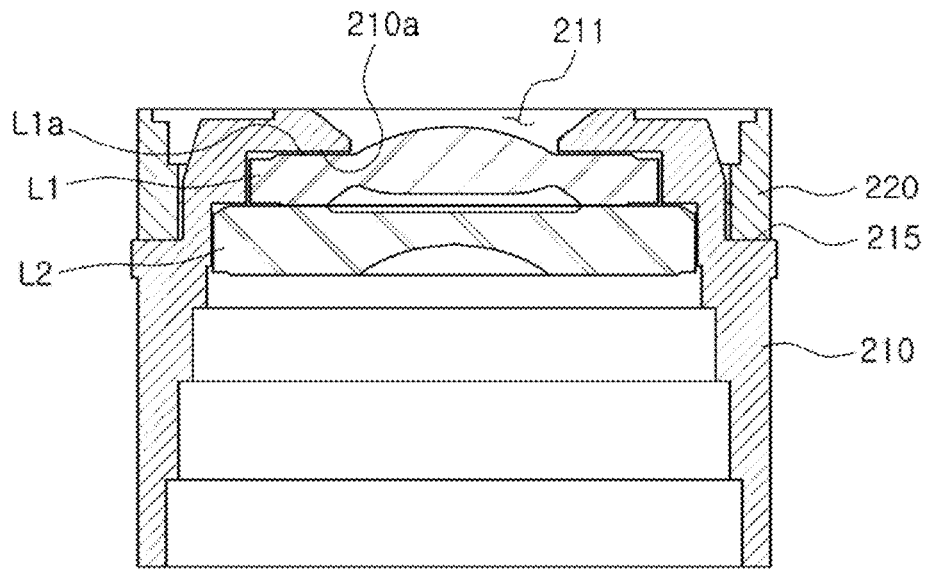
FIG. 4B is a cross-sectional view taken along line A-A' of FIG. 4A.
Figure 4C:
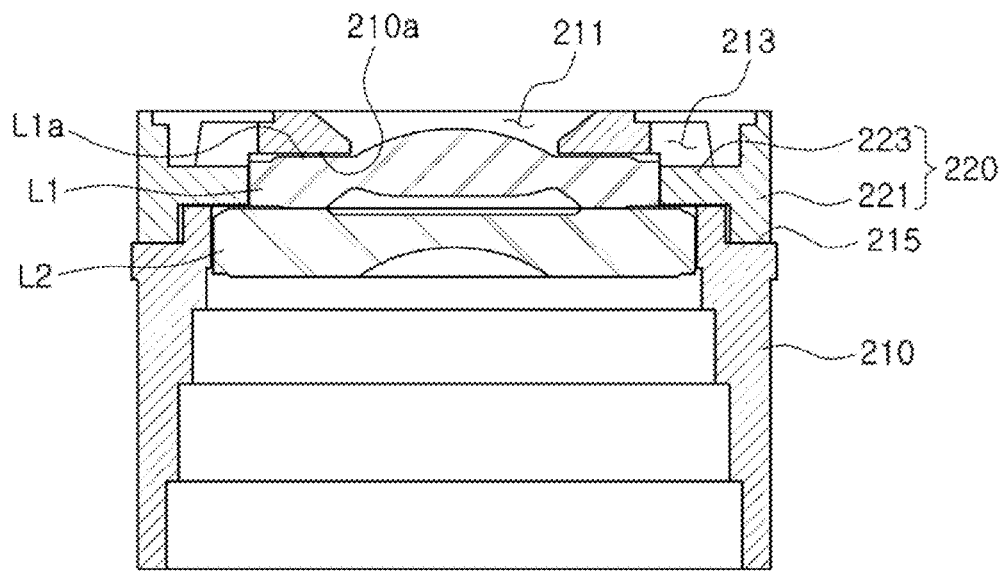
FIG. 4C is a cross-sectional view taken along line B-B' of FIG. 4A.

In addition, FIG. 4A is a plan view of the lens module 200 according to an exemplary embodiment of the present disclosure; FIG. 4B is a cross-sectional view taken along line A-A' of FIG. 4A; and FIG. 4C is a cross-sectional view taken along line B-B' of FIG. 4A.

Referring to FIGS. 2 through 4C, the lens module 200 according to an exemplary embodiment of the present disclosure may include the lens barrel 210 and the lenses accommodated in the lens barrel 210. The lens module 200 may further include the lens holder 220 supporting the lenses.

The lens barrel 210 may have a hollow cylindrical shape so that the lenses may be accommodated therein, and may have an incident hole 211 so that external light is incident to the lenses.

When the external light is incident to the lenses, the incident hole 211 may serve as an aperture.

An amount of the external light incident to the lenses may be adjusted depending on a size of the incident hole 211. The size of the incident hole 211 may be determined depending on a design of an optical system including the lenses in a process of manufacturing the lens barrel 210.

The lens barrel 210 may accommodate one or more lenses therein.

In the case in which a plurality of lenses are provided in the lens barrel 210, the lenses may be disposed in a single direction within the lens barrel 210.

The lens barrel 210 may have one or more openings 213 formed therein to expose an edge of one or more lenses, for example, a first lens L1 closest to an object side, and an edge of a lens that is adjacent to the first lens L1, for example, a second lens L2.

The openings 213 may penetrate through the lens barrel 210 and may be formed in positions corresponding to an edge of the first lens L1.

For example, as illustrated in FIG. 2, the openings 213 may be provided at an edge of an upper portion of the lens barrel 210 and may penetrate through the lens barrel 210 in the optical axis direction (the Z direction) and/or the horizontal direction (the X-Y direction, for example, the direction perpendicular to the optical axis direction (the Z direction)).

Therefore, the edge or part of the first lens L1 may be exposed externally through the openings 213.

The lens holder 220 may be attached or coupled to the lens barrel 210 to support the edge of the first lens L1 exposed to the outside.

The lens barrel 210 may have a step part 215 provided on an outer surface or upper portion thereof, and the lens holder 220 may be seated on the step part 215.

The lens holder 220 may include one or more support parts 223 inserted into the openings 213 to support the edge of the first lens L1.

The support parts 223 may protrude from an inner surface, a lower portion, or any surface of the lens holder 220 toward the edge of the first lens L1.

As illustrated in FIG. 4A, when the lens holder 220 is attached to the lens barrel 210, the support parts 223 and the openings 213 may have a saw-toothed shape when viewed in the optical axis direction (the Z direction).

Here, the first lens L1 may be moved relatively together with the lens holder 220 within the lens barrel 210 in a state in which it is closely adhered to the lens holder 220.

The first lens L1 may be closely adhered to the lens holder 220 so as to be confined therein or coupled thereto, but so as not to be confined with respect to the lens barrel 210.

Therefore, the first lens L1 may be moved relatively, together with the lens holder 220, in the horizontal direction (the X-Y direction) within the lens barrel 210 in a state of being held by the lens holder 220.

Since the first lens L1 may be moved within the lens barrel 210 by moving the lens holder 220, optical axes of lenses may be easily or accurately aligned with each other even in a state in which the first lens L1 is attached to an inner portion of the lens barrel 210.

For example, the first lens L1 may be inserted into the lens barrel 210 so that one surface L1a of the first lens L1 faces one surface 210a of the lens barrel 210 in the optical axis direction (the Z direction). One surface L1a of the first lens L1 and one surface 210a of the lens barrel 210 may have a micro-clearance provided therebetween in the optical axis direction (the Z direction). In addition, one surface L1a of the first lens L1 may also be disposed in a state in which it contacts the surface 210a of the lens barrel 210 to thereby be slidable.

Therefore, one surface L1a of the first lens L1 may be in a state in which it is not confined to one surface 210a of the lens barrel 210 in the optical axis direction (the Z direction) in which one surface L1a of the first lens L1 faces one surface 210a of the lens barrel 210.

Here, one surface L1a of the first lens L1 may be disposed to be in a stress-free state (for example, a state in which force applied to one surface L1a of the first lens L1 is not present or relatively low).

Pressure applied to one surface L1a of the first lens L1 facing one surface 210a of the lens barrel 210 in the optical axis direction (the Z direction) may be less than an amount of pressure applied to a surface of the first lens L1 contacting the lens holder 220.

For example, since the first lens L1 is inserted into the lens barrel 210 so as to be movable relative to the lens barrel 210 and the edge of the first lens L1 is closely adhered to and/or supported by the lens holder 220, the pressure applied to the surface of the first lens L1 contacting the lens holder 220 may be larger than the pressure applied to one surface L1a of the first lens L1 facing one surface 210a of the lens barrel 210 in the optical axis direction (the Z direction).

In addition, the pressure applied to one surface L1a of the first lens L1 may be less than an amount of pressure applied to another surface of the first lens L1 (e.g. a lower surface of the first lens L1 directly or indirectly contacting another lens).

Since the first lens L1 is accommodated in the lens barrel 210 in a state in which it is not confined to or fixed to the lens barrel 210 and is supported by the lens holder 220, the first lens L1 may be moved by moving the lens holder 220 attached to the outside of the lens barrel 210.

The case in which the first lens L1 is movable relatively in the lens barrel 210 in a state in which it is closely adhered to and supported by the lens holder 220 has been described in the exemplary embodiment of the present disclosure. However, a position of the first lens L1 may also be adjusted or is movable by pressing the edge of the first lens L1 exposed to the outside using, for example, a separate jig, or the like, in a state in which the edge of the first lens L1 is exposed to the outside of the lens barrel 210.

Referring to FIG. 4B, the first lens L1 and the lens barrel 210 may have a micro clearance formed therebetween in the optical axis direction (the Z direction) and/or may have a micro clearance formed therebetween in the horizontal direction (the X-Y direction). For example, the first lens L1 may not contact the lens barrel 210 in the optical axis direction (the Z direction) and/or the horizontal direction (the X-Y direction), and may not be confined to the lens barrel 210.

Meanwhile, the first lens L1 may directly contact another lens (for instance, second lens L2) adjacent thereto or may indirectly contact another lens through an interval maintaining member provided between the first lens L1 and another lens. In addition, although not shown, the first lens L1 may also be disposed in a state in which the first lens L1 is spaced apart from both of the lens barrel 210 and the second lens L2 in the optical axis direction (the Z direction) in a state in which the first lens L1 is supported by the lens holder 220.

Referring to FIG. 4C, the first lens L1 may be closely adhered or coupled to and/or supported by the lens holder 220 in a state in which it maintains a clearance from the lens barrel 210 in the optical axis direction (the Z direction). Therefore, the first lens L1 may be moved together with the lens holder 220 in a state in which it is confined by or coupled to the lens holder 220.

For example, the lens holder 220 and the first lens L1 may be moved relative to the lens barrel 210.

Figure 5A:
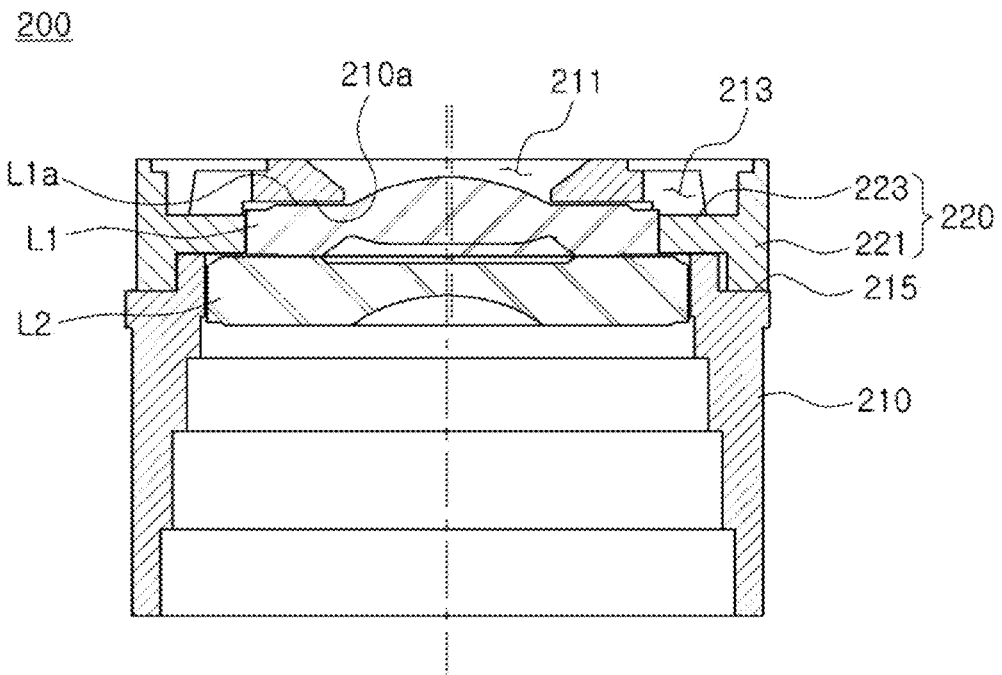
FIGS. 5A and 5C are cross-sectional views illustrating a state in which optical axes of lenses are misaligned with each other in the lens module according to an exemplary embodiment of the present disclosure.
Figure 5B:
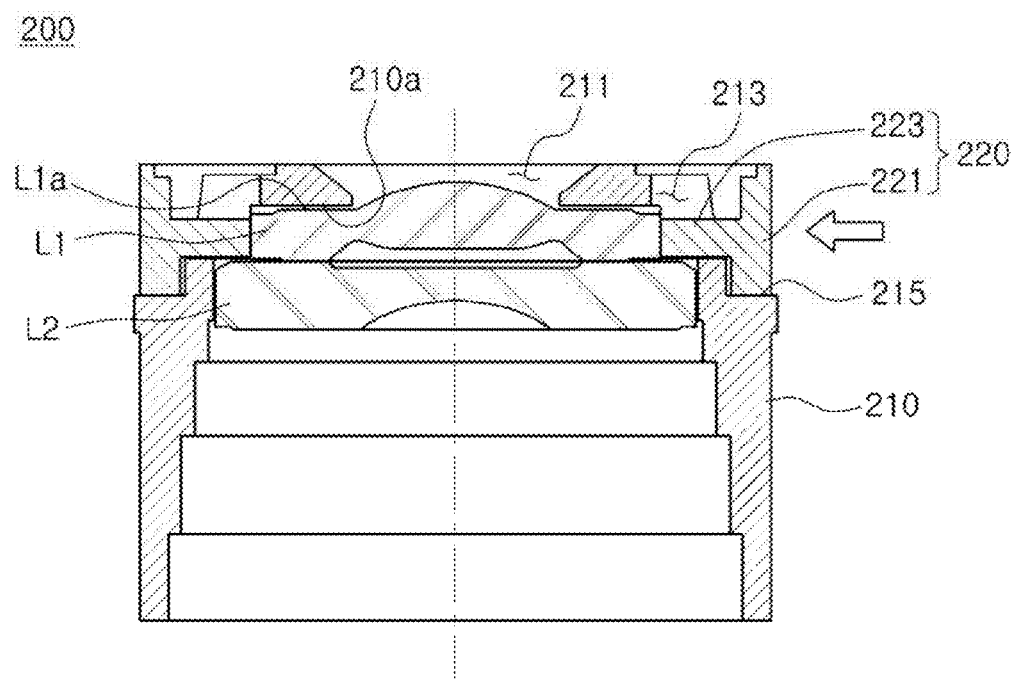
FIGS. 5B and 5D are cross-sectional views illustrating a state in which optical axes of lenses are aligned with each other by moving the lenses in the lens module according to an exemplary embodiment of the present disclosure.
Figure 5C:
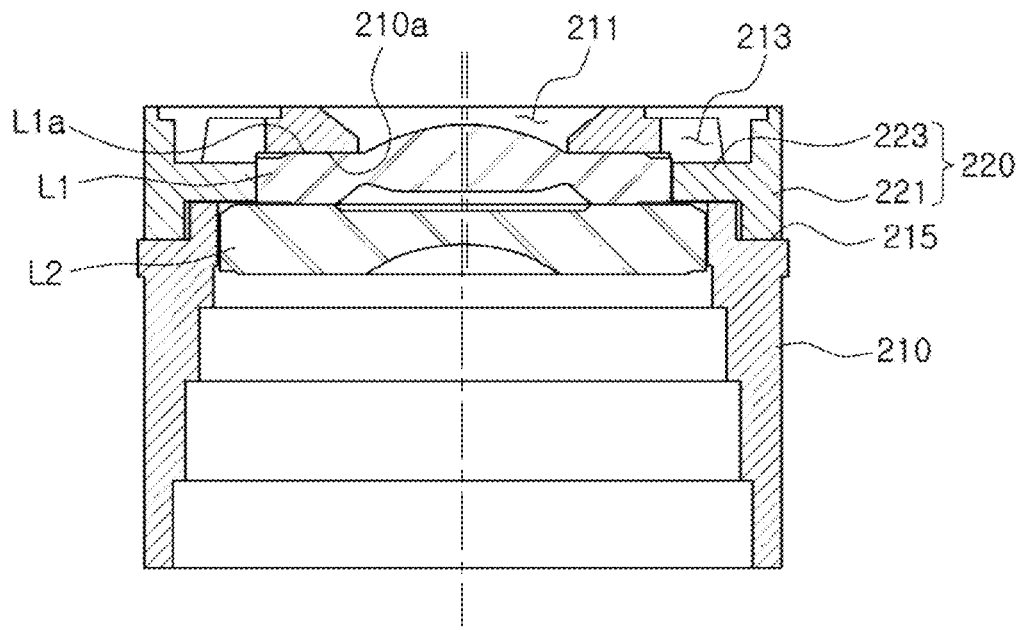
Figure 5D:
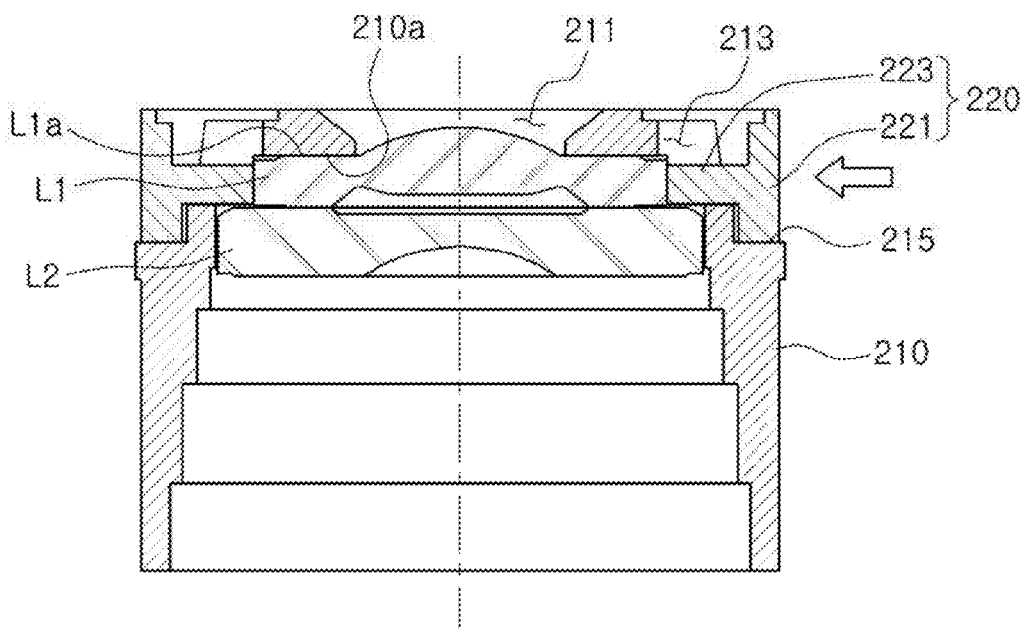

FIGS. 5A and 5C are cross-sectional views illustrating a state in which optical axes of lenses are misaligned with each other in the lens module 200 according to an exemplary embodiment of the present disclosure; and FIGS. 5B and 5D are cross-sectional views illustrating a state in which optical axes of lenses are aligned with each other by moving the lenses in the lens module 200 according to an exemplary embodiment of the present disclosure.

A process of aligning optical axes of lenses with each other in the lens module 200 according to an exemplary embodiment of the present disclosure will be described with reference to FIGS. 5A through 5D.

First, as illustrated in FIGS. 5A and 5C, the case in which an optical axis of the first lens L1 inserted into the lens barrel 210 does not coincide with that of the second lens L2 may occur in a process of assembling the lens module 200 according to an exemplary embodiment of the present disclosure.

When optical axes of a plurality of lenses accommodated in the lens module 200 are not aligned with each other, image resolution may be negatively affected. Therefore, a process of aligning the optical axes of lenses with each other may be required in order to obtain a higher resolution image.

Referring to FIG. 5B, in the lens module 200 according to an exemplary embodiment of the present disclosure, since the edge of the first lens L1 is closely adhered to and supported by the lens holder 220 in a state in which the clearance is formed between the first lens L1 and the lens barrel 210 in the optical axis direction (the Z direction), the first lens L1 may be moved by moving the lens holder 220. Therefore, the optical axes of the first and second lenses L1 and L2 can be made to coincide with each other, and the optical axes may thus be easily or precisely aligned with each other.

In addition, referring to FIG. 5D, since the edge of the first lens L1 is closely adhered to and supported by the lens holder 220 in a state in which one surface L1a of the first lens L1 contacts one surface 210a of the lens barrel 210 to face each other in the optical axis direction (the Z direction) (for example, in a contact relation enough to be slid), the first lens L1 may be moved (or slid) by moving the lens holder 220. Through these processes, the optical axes of the first and second lenses L1 and L2 are made to coincide with each other, and the optical axes may be easily or accurately aligned with each other.

Meanwhile, referring to FIG. 4B, an inner surface of the lens barrel 210 facing a side surface of the first lens L1 may serve as a stopper limiting a movement distance when the first lens L1 is moved in the horizontal direction (the X-Y direction).

Therefore, the first lens L1 may partially contact the lens barrel 210 in the horizontal direction (the X-Y direction) after the optical axes are aligned with each other. However, the first lens L1 may still maintain a clearance from the lens barrel 210 in the horizontal direction (the X-Y direction) after the optical axes are aligned with each other depending on a position to which the first lens L1 is moved.

Figure 5E:
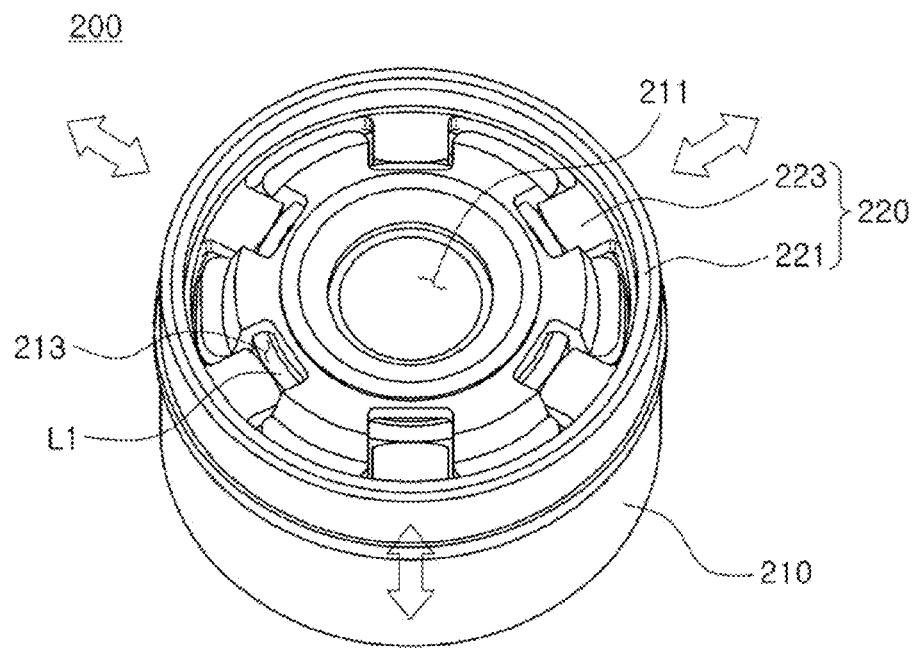
FIG. 5E is a perspective view illustrating a lens module according to an exemplary embodiment of the present disclosure.

Referring to FIG. 5E, in the lens module 200 according to an exemplary embodiment of the present disclosure, the optical axes of lenses may be easily aligned with each other by moving the lens holder 220 supporting the first lens L1, even in a state in which the plurality of lenses are attached to the inner portion of the lens barrel.

After the first lens L1 is moved together with the lens holder 220 to a position at which the optical axes of lenses are aligned with each other, the lens holder 220 may be fixed to the lens barrel 210. For example, an adhesive or the like may be used to fix the lens holder 220 to the lens barrel. Therefore, the lens module 200 may be maintained in a state in which the optical axes of all lenses accommodated therein are aligned with each other.

Figure 6A:
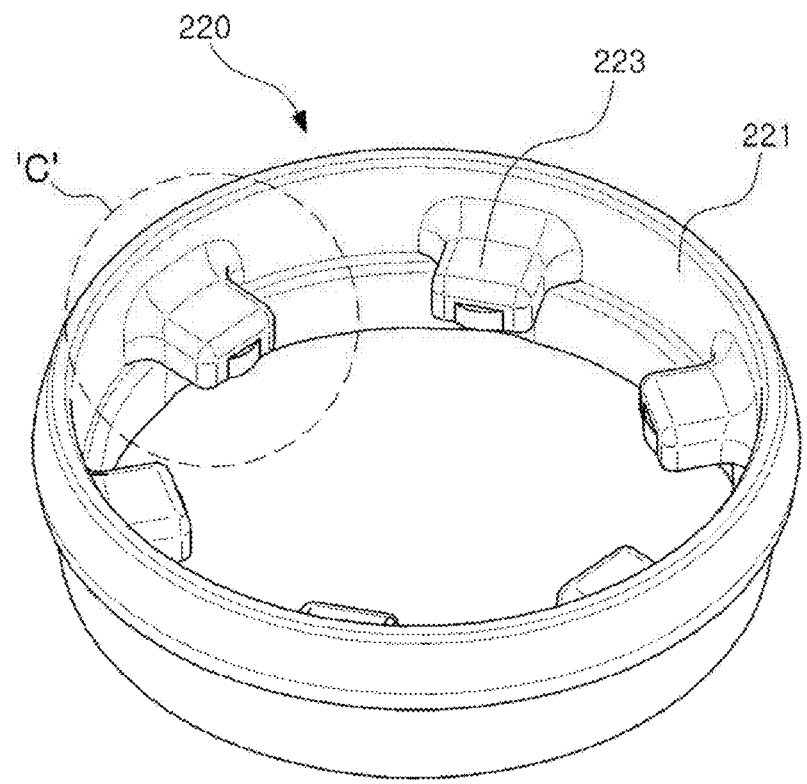
FIG. 6A is a perspective view of a lens holder provided in the lens module according to an exemplary embodiment of the present disclosure.
Figure 6B:
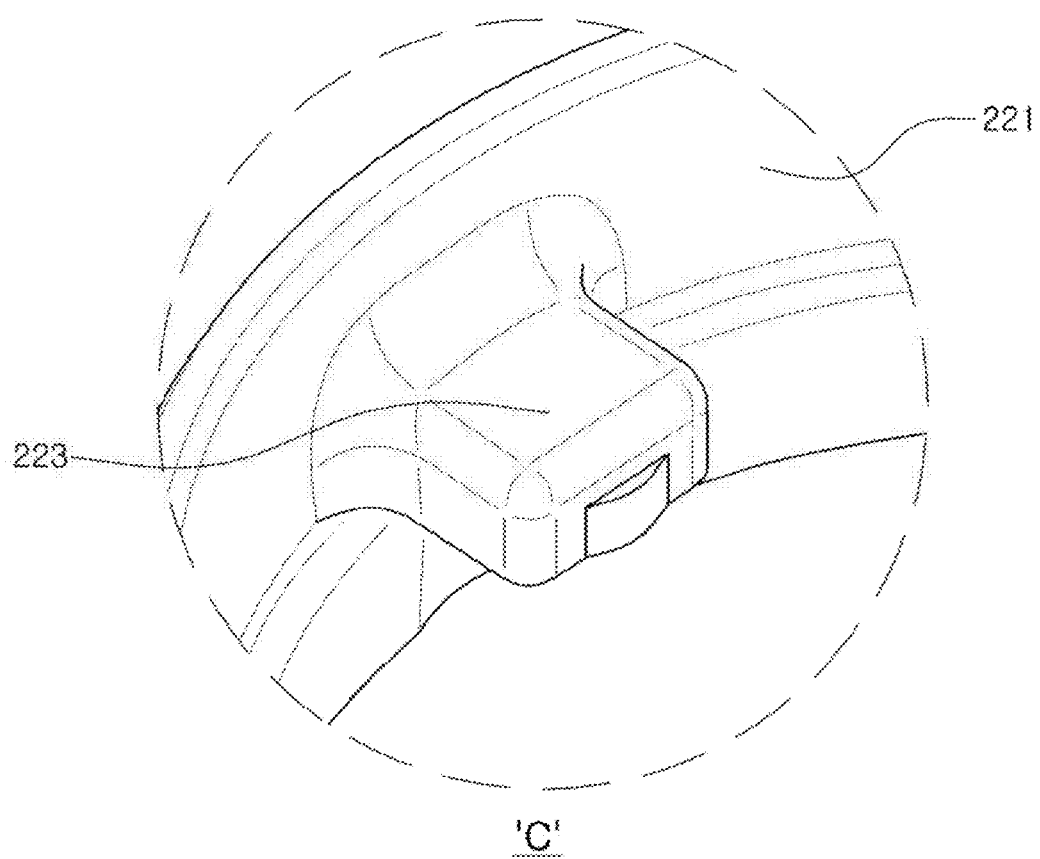
FIG. 6B is a partially enlarged view of part C of FIG. 6A.

FIG. 6A is a perspective view of a lens holder 220 provided in the lens module 200 according to an exemplary embodiment of the present disclosure, and FIG. 6B is a partially enlarged view of part C of FIG. 6A.

Referring to FIGS. 6A and 6B, the lens holder 220 may include a body part 221 and one or more support parts 223 protruding from the body part 221 toward the first lens L1, for instance, the edge of the first lens L1.

The body part 221 may have a ring shape, but not limited thereto, and may be attached to the lens barrel 210.

The number of support parts 223 may correspond to that of openings 213 so that each of the support parts 223 are inserted into the corresponding opening 213 provided in the lens barrel 210 when the body part 221 is attached to the lens barrel 210.

In addition, a plurality of support parts 223 may be provided to be symmetrical to each other based on the optical axis.

The support parts 223 may be inserted into the openings 213 to support the edge of the first lens L1 exposed to the outside of the lens barrel 210 through the openings 213.

Here, referring to FIG. 6B, the support part 223 may support the side surface of the first lens L1 in the edge of the first lens L1.

The support part 223 may comprise a curved surface contacting the side surface of the first lens L1.

Therefore, the first lens L1 may point-contact or line-contact the support parts 223 and may be moved in order to align the optical axes of the lenses with each other within the lens barrel 210 in a state in which it is supported by the support parts 223.

Figure 7:
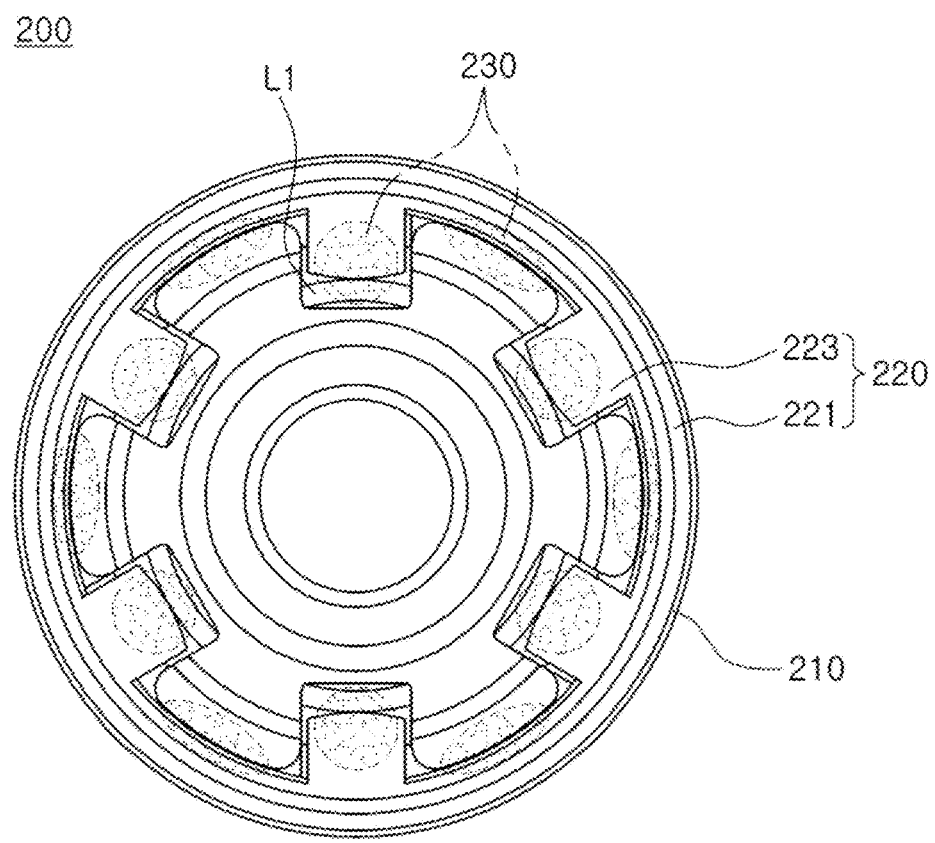
FIG. 7 is a plan view illustrating a state in which a position of the lens holder in the lens module is fixed according to an exemplary embodiment of the present disclosure.

FIG. 7 is a plan view illustrating a state in which a position of the lens holder 220 in the lens module 200 is fixed according to an exemplary embodiment of the present disclosure.

After the optical axes of lenses are aligned with each other by moving the first lens L1 together with the lens holder 220, the position of the first lens L1 may be fixed.

Therefore, in the lens module 200 according to the exemplary embodiment of the present disclosure, the position of the lens holder 220 may be fixed by applying, for example, an adhesive 230 to a portion at which the lens holder 220 and the lens barrel 210 contact each other.

When the position of the lens holder 220 is fixed to the lens barrel 210, the first lens L1 closely adhered to and supported by the lens holder 220 may also be fixed. Therefore, the lens module 200 may be maintained in a state in which the optical axes of lenses are aligned with each other.

The adhesive 230 may be applied to a location at which the lens holder 220 and the first lens L1 contact each other as well as to a location at which the lens holder 220 and the lens barrel 210 contact each other.

Figure 8A:
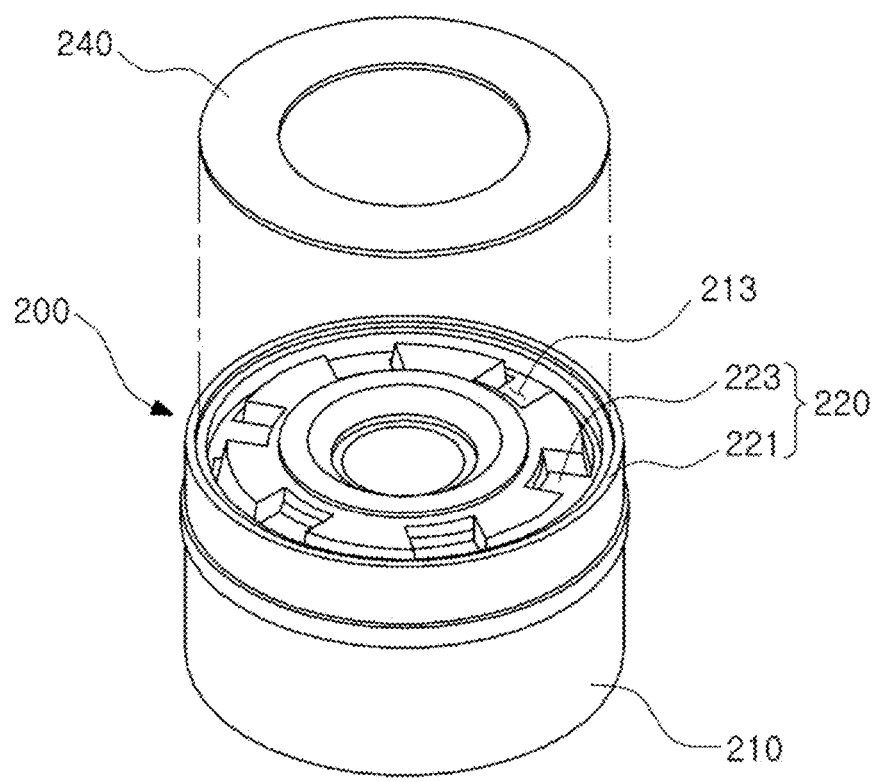
FIG. 8A is a perspective view illustrating a state before a cover part is coupled to the lens module according to an exemplary embodiment of the present disclosure.
Figure 8B:
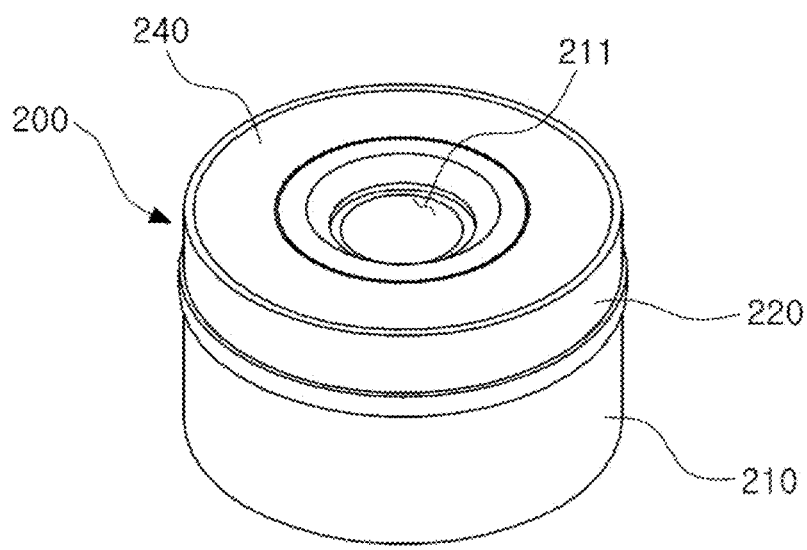
FIG. 8B is a perspective view illustrating a state after the cover part is coupled to the lens module according to an exemplary embodiment of the present disclosure.

FIG. 8A is a perspective view illustrating a state before a cover part 240 is coupled to the lens module 200 according to an exemplary embodiment of the present disclosure, and FIG. 8B is a perspective view illustrating a state after the cover part 240 is coupled to the lens module 200 according to an exemplary embodiment of the present disclosure.

Referring to FIGS. 8A and 8B, the lens module 200 according to an exemplary embodiment of the present disclosure may further include a cover part 240.

Since the edge of the first lens L1 is in a state in which it is exposed through the outside by the openings 213 provided in the lens barrel 210, external foreign objects may be introduced into the lens barrel 210.

Therefore, the lens module 200 according to an exemplary embodiment of the present disclosure may further include the cover part 240 covering the openings 213.

The cover part 240 may cover the openings 213 to cover the edge of the first lens L1 exposed to the outside of the lens barrel 210 through the openings 213.

Since the inner portion of the lens barrel 210 may be maintained in a state in which it is closed off from an outer portion thereof by the cover part 240, the introduction of external foreign objects into the lens barrel 210 may be prevented.

Figure 9A:
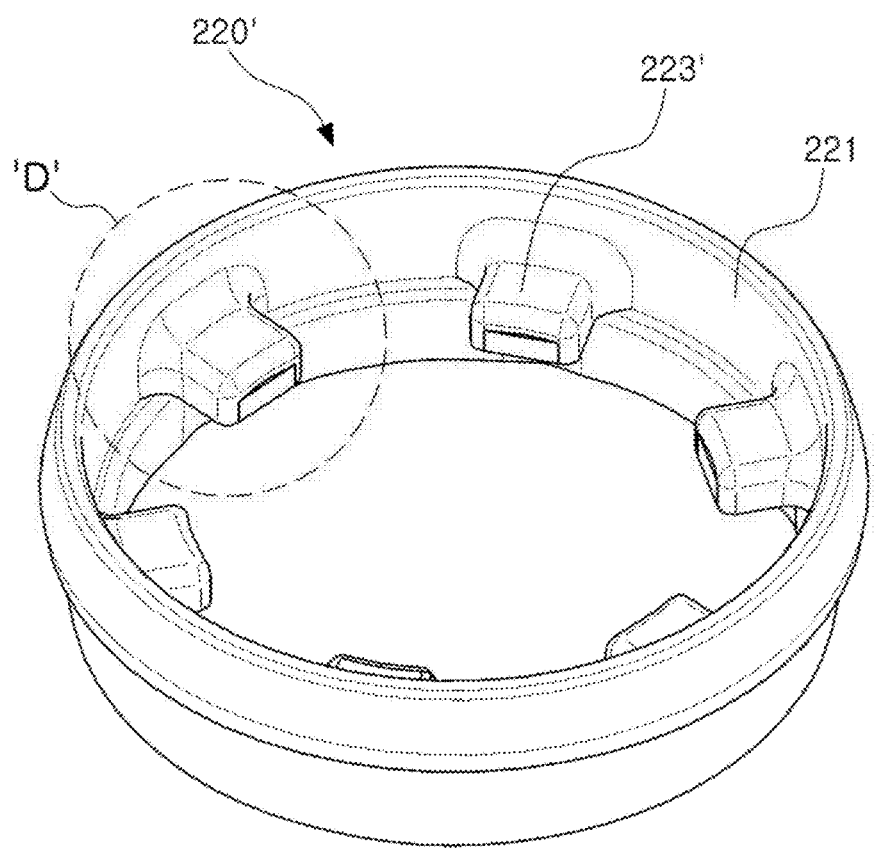
FIG. 9A is a perspective view illustrating a first modified example of the lens holder provided in the lens module according to an exemplary embodiment of the present disclosure.
Figure 9B:
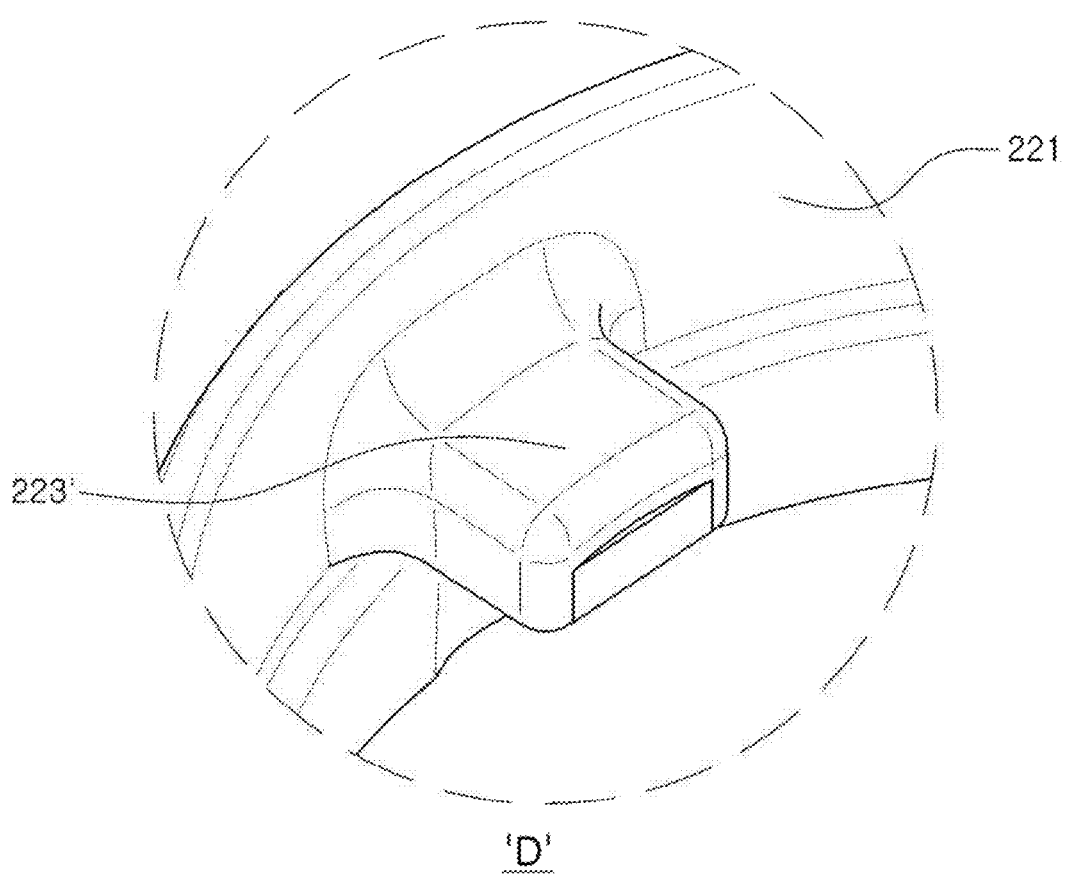
FIG. 9B is a partially enlarged view of part D of FIG. 9A.

FIG. 9A is a perspective view illustrating a first modified example of the lens holder, for example, a lens holder 220', provided in the lens module 200 according to an exemplary embodiment of the present disclosure, and FIG. 9B is a partially enlarged view of part D of FIG. 9A.

Figure 10A:
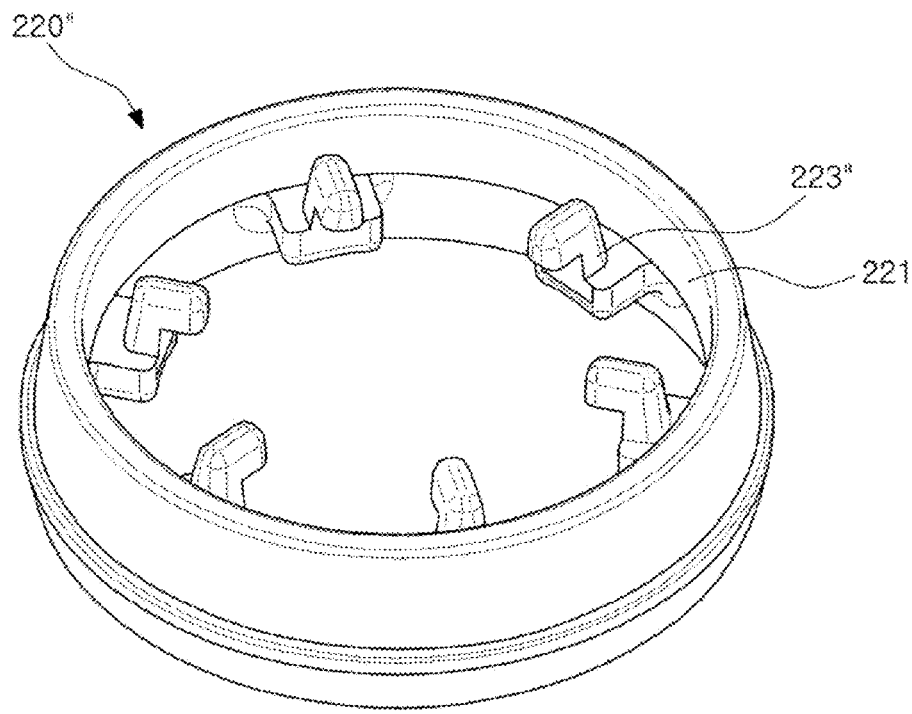
FIG. 10A is a perspective view illustrating a second modified example of the lens holder provided in the lens module according to an exemplary embodiment of the present disclosure.
Figure 10B:
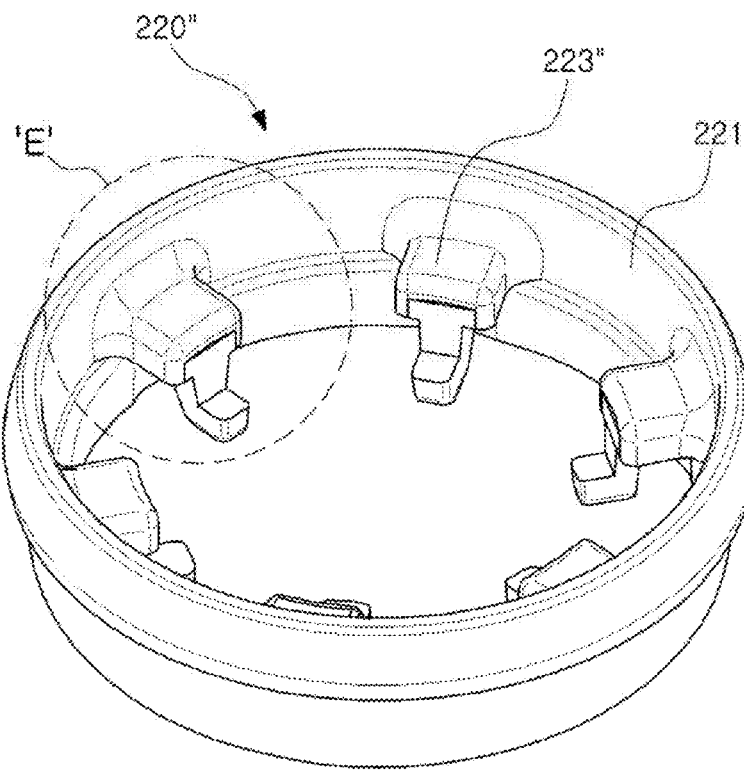
FIG. 10B is a bottom perspective view of the second modified example of the lens holder.
Figure 10C:
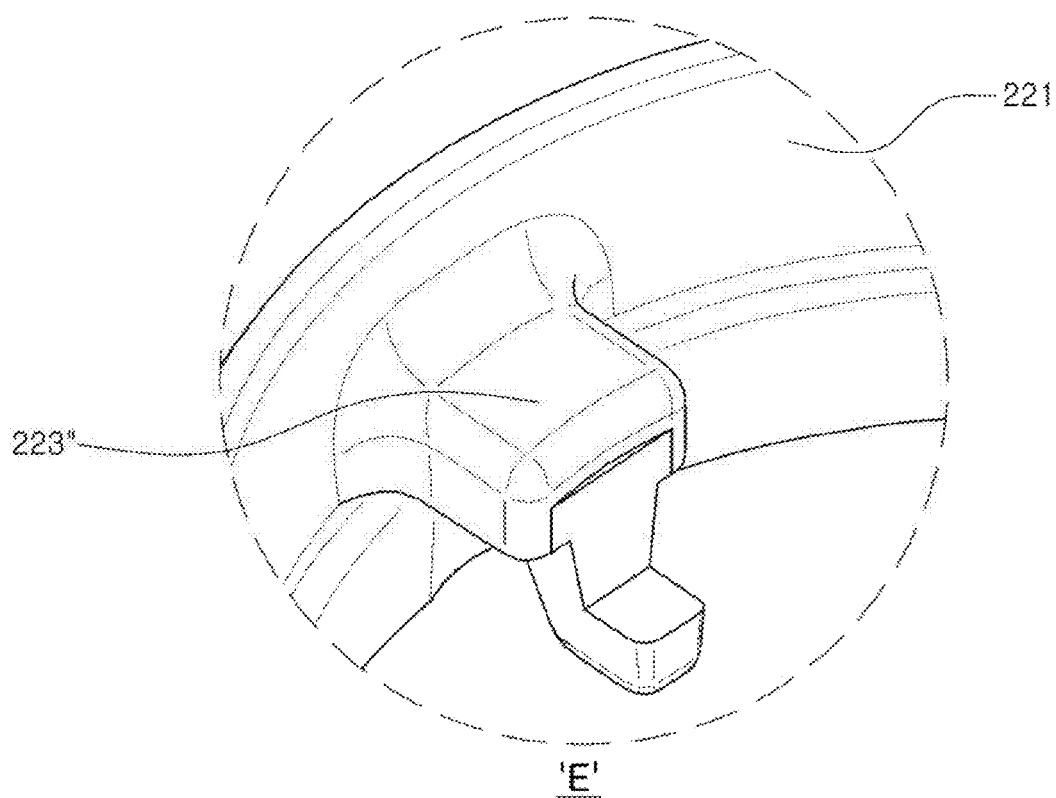
FIG. 10C is a partially enlarged view of part E of FIG. 10B.

In addition, FIG. 10A is a perspective view illustrating a second modified example of the lens holder, for example, a lens holder 220", provided in the lens module 200 according to an exemplary embodiment of the present disclosure, FIG. 10B is a bottom perspective view of the second modified example of the lens holder 200", and FIG. 10C is a partially enlarged view of part E of FIG. 10B.

Referring to FIGS. 9A and 9B, the support part 223' may support the side surface of the first lens L1 in the edge of the first lens L1.

The support part 223' may comprise a flat surface contacting the side surface of the first lens L1.

Therefore, the first lens L1 may point-contact or line-contact the support parts 223' and may be moved in order to align the optical axes of lenses with each other within the lens barrel 210 in a state in which it is supported by the support parts 223'.

Referring to FIG. 10A, the support part 223" provided in the lens holder 220" may protrude from the body part 221 toward the optical axis, and a portion of the support part 223" contacting the first lens L1 may have a ']' or hooked shape to enclose the edge of the first lens L1.

Therefore, upper and side surfaces in the edge of the first lens L1 may be closely adhered to the support parts 223".

Referring to FIGS. 10B and 10C, a contact surface of the support part 223" contacting the edge of the first lens L1 may be flat. For example, the upper surface in the edge of the first lens L1 may surface-contact the support part 223", and the side surface in the edge of the first lens L1 may point-contact or line-contact the support part 223".

FIGS. 11A through 11F are cross-sectional views illustrating a method of manufacturing a lens module according to an exemplary embodiment of the present disclosure.

First, as illustrated in FIGS. 11A through 11E, a plurality of lenses may be disposed in a single direction within the lens barrel 210 provided in the lens module 200 according to an exemplary embodiment of the present disclosure.

For example, a first lens L1, a second lens L2, a third lens L3, a fourth lens L4, a fifth lens L5, and a press-fitting ring 250 may be sequentially disposed in a direction from an object side toward an image side.

Although five lenses are disposed in the exemplary embodiment of the present disclosure, the present invention is not limited to the number of lenses.

The lens barrel 210 may have one or more openings 213 penetrating therethrough, and the edge of the first lens L1 may be exposed to the outside of the lens barrel 210 through the openings 213.

The first to fifth lenses L1 to L5 may be inserted into the lens barrel 210 in a state in which the lens barrel 210 is overturned so that the incident hole 211 of the lens barrel 210 is positioned downwardly.

For example, all of the first to fifth lenses L1 to L5 may be sequentially inserted into the lens barrel 210 in a direction from the image side toward the object side.

Since all of the first to fifth lenses L1 to L5 are inserted into the lens barrel 210 in the same direction, a manufacturing process and manufacturing costs may be decreased as compared with the case in which anyone lens is inserted into the lens barrel in a direction different from a direction in which other lenses are inserted.

The first lens L1 may be inserted into the lens barrel 210 in a state in which it may be driven.

Figure 11A:
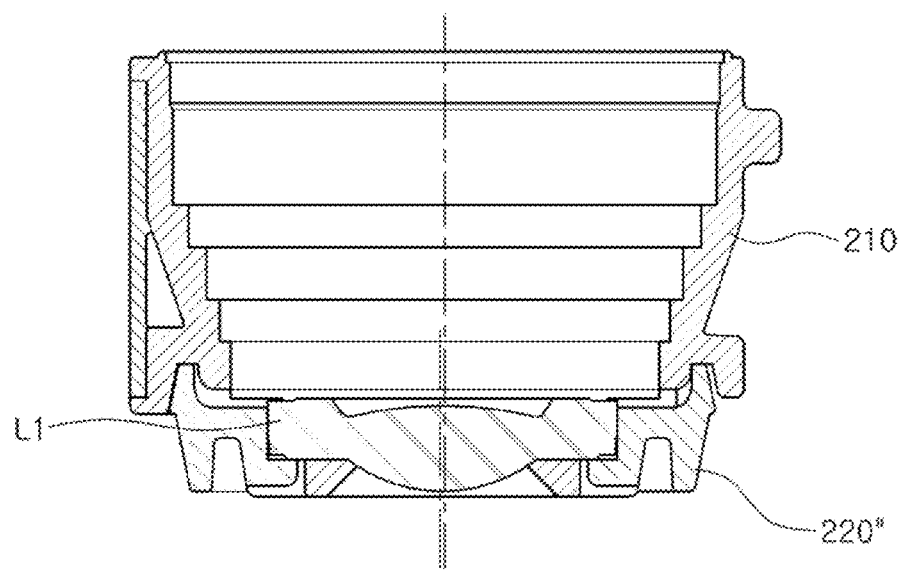
FIGS. 11A through 11F are cross-sectional views illustrating a method of manufacturing a lens module according to an exemplary embodiment of the present disclosure.
Figure 11B:
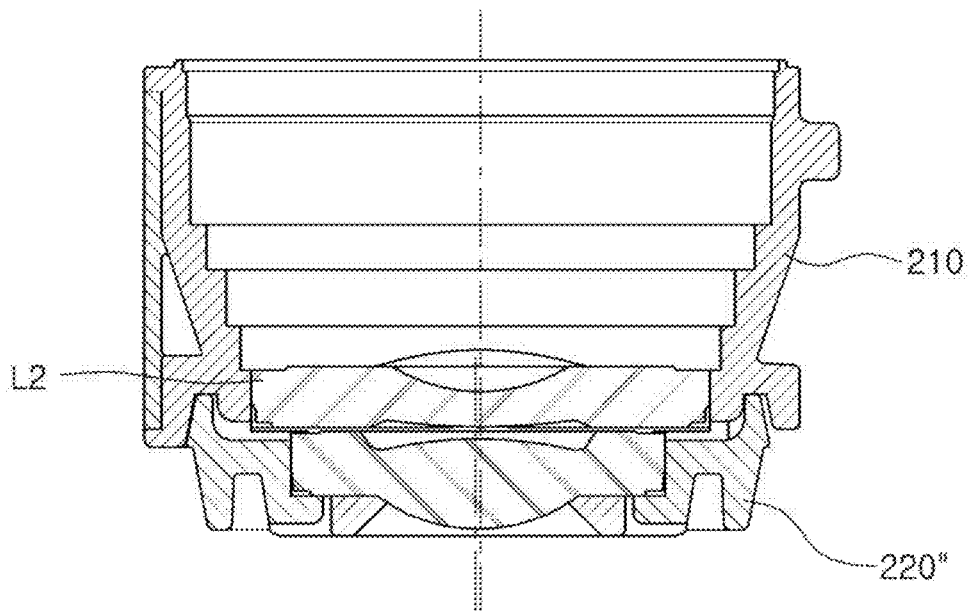
Figure 11C:
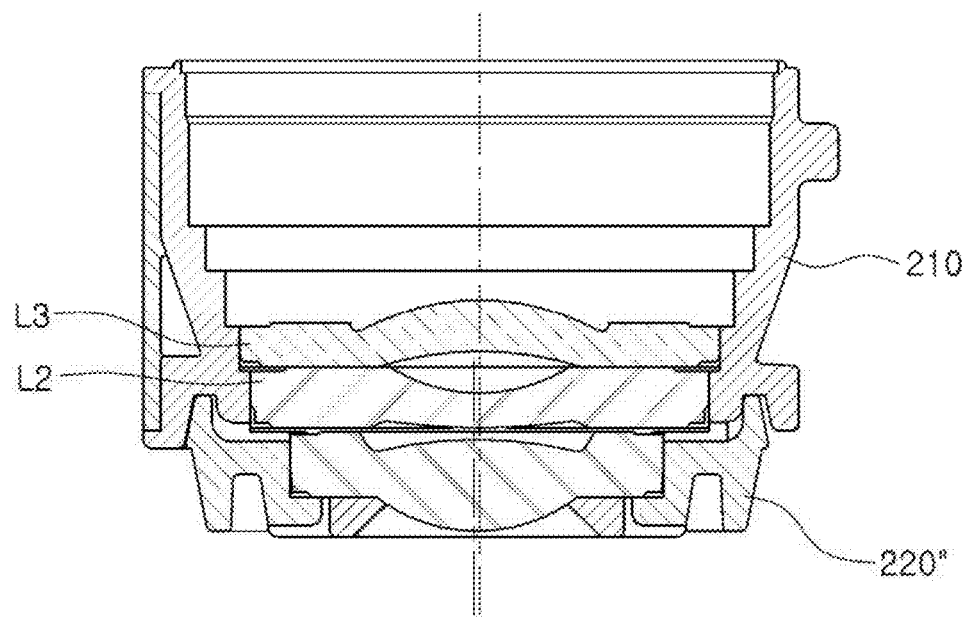
Figure 11D:
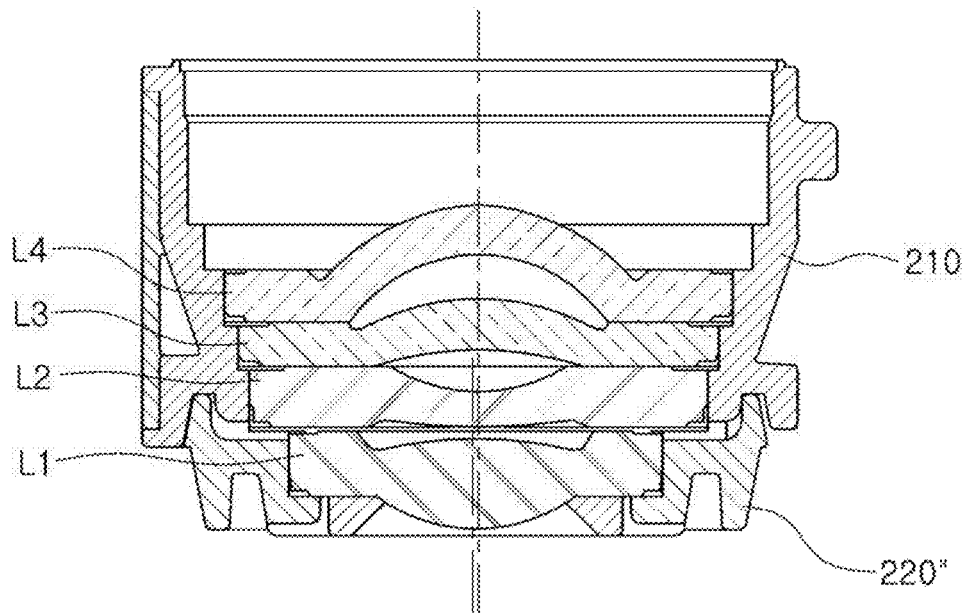
Figure 11E:
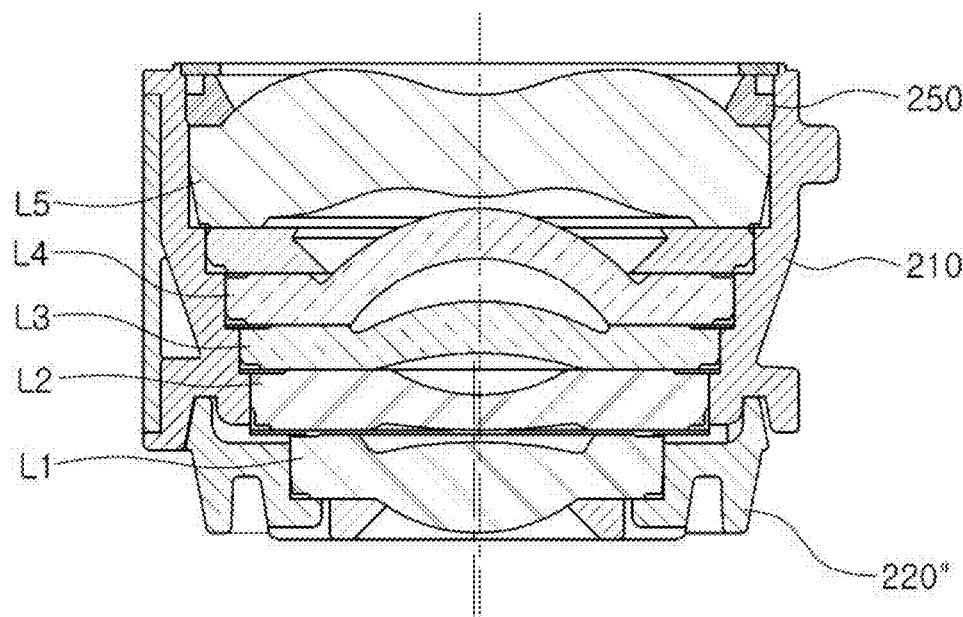
Figure 11F:
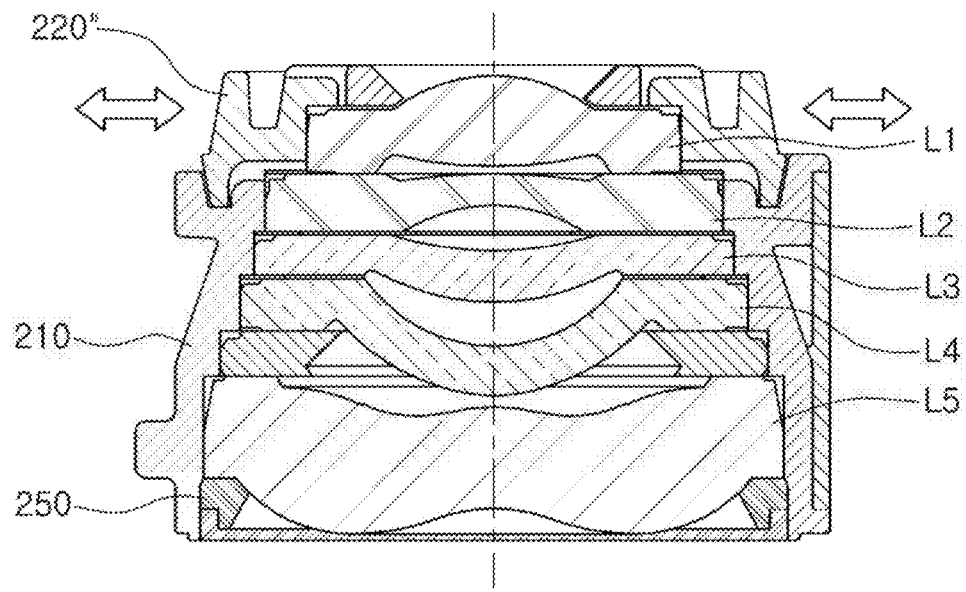

In this case, although one surface L1a of the first lens L1 is in a state in which it contacts one surface 210a of the lens barrel 210 to face the one surface 210a of the lens barrel 210 in the optical axis direction (the Z direction) (see FIGS. 11A through 11E), when the lens barrel 210 is inverted to its original orientation (a state in which the incident hole 211 is positioned upwardly) after the attachment of the first to fifth lenses L1 to L5 is completed, a micro clearance may be formed between one surface L1a of the first lens L1 and one surface 210a of the lens barrel 210 (See FIG. 11F).

Alternatively, one surface L1a of the first lens L1 and one surface 210a of the lens barrel 210 may not have the micro clearance formed therebetween, but contact each other. The surface L1a of the first lens L1 may be disposed in a state in which the surface L1a of the first lens L1 is slidable with respect to the surface 210a of the lens barrel 210.

For example, the surface L1a of the first lens L1 may be disposed to be in a stress-free state.

The first lens L1 may not be press-fitted into the lens barrel 210, but may be inserted into the lens barrel 210 to be movable relative to the lens barrel 210.

When the first lens L1 is inserted into the lens barrel 210, the lens holder 220 may be attached to the lens barrel 210 to support the first lens L1.

Meanwhile, the present disclosure is not limited to a sequence in which the first lens L1 and the lens holder 220 are assembled. For example, the first lens L1 may be inserted into the lens barrel 210 after the lens holder 220 is attached to the lens barrel 210. Alternatively, the lens holder 220 may be attached to the lens barrel 210 after all of the first to fifth lenses L1 to L5 are inserted into the lens barrel 210.

The second to fifth lenses L2 to L5 may be inserted into the lens barrel 210 in a press-fitting scheme.

Therefore, the second to fifth lenses L2 to L5 may be fixed in a state in which they are press-fitted into the lens barrel 210.

However, an insertion scheme of the second to fifth lenses L2 to L5 is not limited to the press-fitting scheme. For example, the second to fifth lenses L2 to L5 may have inclined surfaces on contact surfaces between lenses adjacent to each other and may be inserted into the lens barrel 210 along the inclined surfaces, such that positions between the lenses adjacent to each other may be naturally aligned with each other.

After the fifth lens L5 is inserted into the lens barrel 210, the press-fitting ring 250 may be inserted into the lens barrel 210 to fix positions of the second to fifth lenses L2 to L5.

Then, it may be determined whether the first to fifth lenses L1 to L5 have been assembled in a state in which optical axes thereof are aligned with each other. In the case in which the first to fifth lenses L1 to L5 are assembled in the state in which the optical axes thereof are aligned with each other, a position of the lens holder 220 may be fixed, for example, using an adhesive, or the like, to fix a position of the first lens L1 supported by the lens holder 220.

However, in the case in which the optical axes of the lenses are not aligned with each other, the position of the first lens L1 may be adjusted by moving the lens holder 220, as illustrated in FIG. 11F.

For example, the lens holder 220 may be moved relatively to a position at which the optical axes of the lenses are aligned with each other, with respect to the lens barrel 210.

Here, the first lens L1 may be moved relative to the lens barrel 210 in a state in which the first lens L1 is spaced apart from the lens barrel 210 in the optical axis direction or may be slid in a state in which it contacts the lens barrel 210 in the optical axis direction.

When the alignment of the optical axes of the first to fifth lenses L1 to L5 is completed, the position of the lens holder 220 may be fixed using the adhesive, or the like.

Since the position of the first lens L1 may be easily or precisely adjusted by the method according to the present disclosure even though all of the first to fifth lenses L1 to L5 are assembled in the same direction, an optical axis aligning process may be easy, and a manufacturing process and manufacturing costs may be decreased.

For example, even though aligning of the lens module is required, a direction in which the first lens L1 is assembled does not need to be different from a direction in which other lenses are assembled, and all of the lenses may be attached to the lens barrel 210 in the same direction, such that the manufacturing process and the manufacturing cost may be decreased.

Figure 12A:
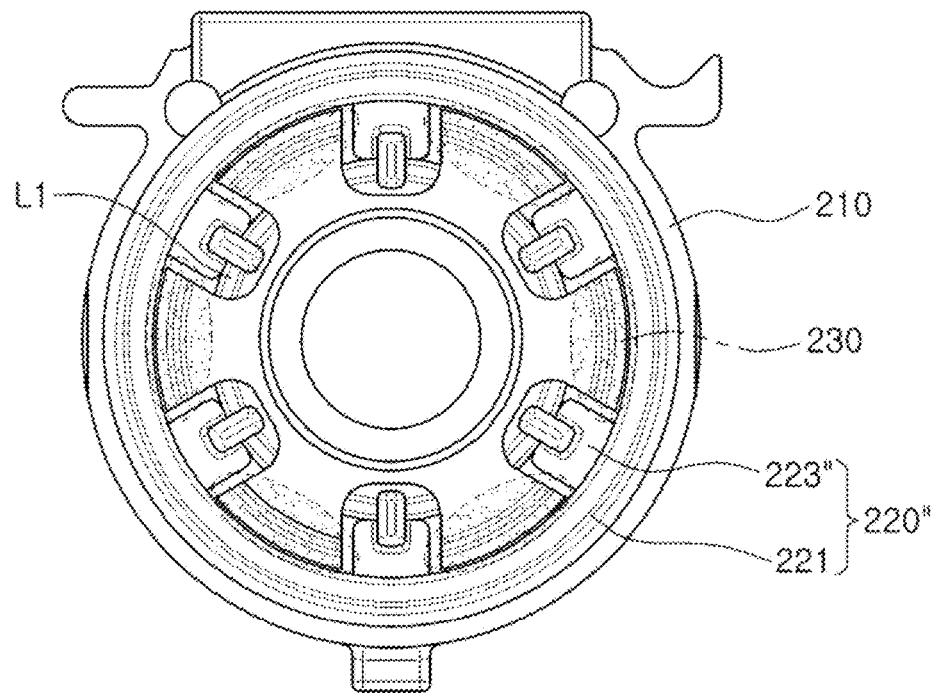
FIGS. 12A through 12C are plan views and a cross-sectional view illustrating a method of fixing a position of a lens holder using an adhesive.
Figure 12B:
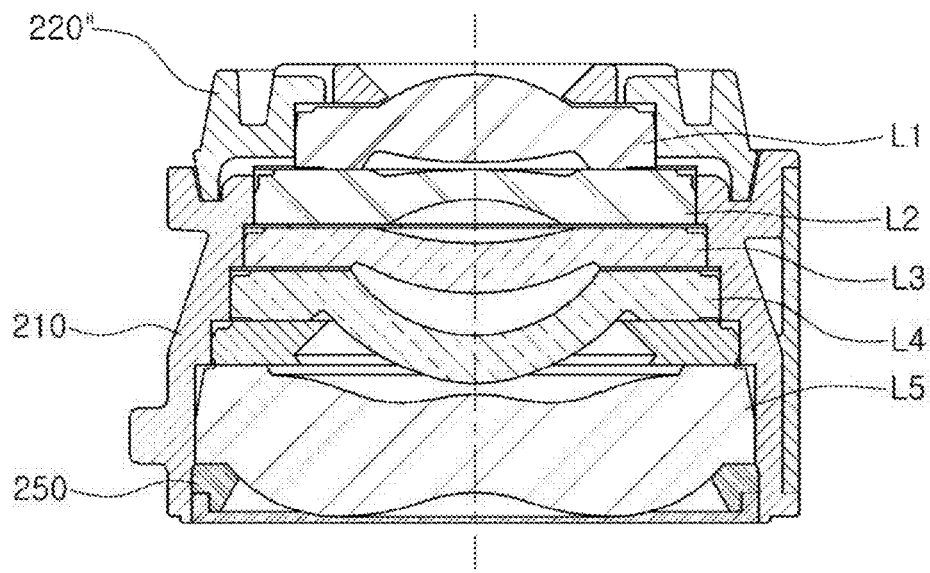
Figure 12C:
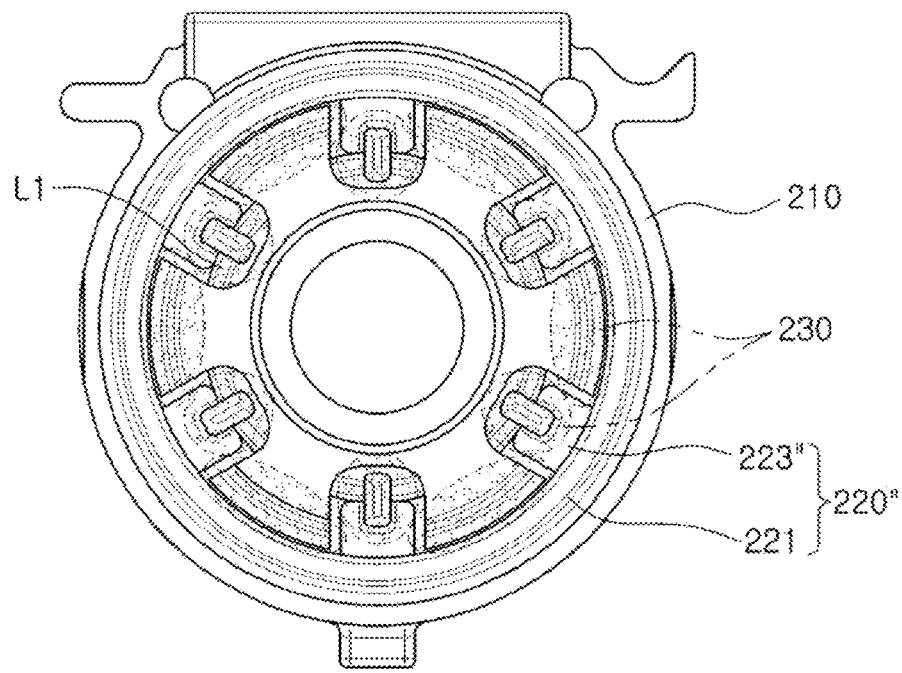

FIGS. 12A through 12C are plan views and a cross-sectional view illustrating a method of fixing a position of a lens holder 220 using an adhesive 230.

First, referring to FIG. 12A, the adhesive 230 may be applied onto a contact surface between the lens holder 220 and the lens barrel 210 before the position of the first lens L1 is adjusted.

For example, the adhesive 230 may be applied to the contact surface between the lens holder 220 and the lens barrel 210 after the lens holder 220 is attached to the lens barrel 210.

Here, the adhesive 230 may be, for instance, an ultraviolet (UV) curable adhesive.

Next, as illustrated in FIG. 12B, the lens holder 220 may be moved to adjust the position of the first lens L1, thereby aligning the optical axes of lenses with each other.

Then, light may be irradiated onto the UV adhesive 230 to cure the UV adhesive, thereby fixing the position of the lens holder 220.

In this case, as illustrated in FIG. 12C, the adhesive 230 may also be applied onto a contact surface between the lens holder 220 and the first lens L1 and be hardened.

With the lens module, the method of manufacturing the same, and the camera module including the same according to exemplary embodiments of the present disclosure, the optical axes of the lenses may be easily or accurately aligned with each other.

In addition, in the case in which the plurality of lenses are disposed in the lens barrel, the optical axes thereof may be aligned with each other even though all of the lenses are assembled in the same direction, such that the manufacturing process may be simplified and manufacturing costs may be decreased.

While exemplary embodiments have been shown and described above, it will be apparent to those skilled in the art that modifications and variations could be made without departing from the spirit and scope of the present disclosure as defined by the appended claims.

What is claimed is:

1. A lens module comprising:
a lens barrel; and
a lens accommodated in the lens barrel and having a surface facing an upper surface of the lens barrel in an optical axis direction,
wherein an edge of the lens is exposed to an outside of the lens barrel, and
the surface of the lens is in a stress-free state with respect to the upper surface of the lens barrel.

2. The lens module of claim 1, wherein a micro clearance is provided between the surface of the lens and the upper surface of the lens barrel in the optical axis direction.

3. The lens module of claim 1, wherein the surface of the lens is disposed in a state in which the surface of the lens is slidable with respect to the upper surface of the lens barrel.

4. The lens module of claim 1, further comprising a lens holder attached to the lens barrel, wherein the lens holder supports an edge of the lens.

5. The lens module of claim 4, wherein the lens is closely adhered to the lens holder, and a micro clearance is formed between the lens and the lens barrel in the optical axis direction.

6. The lens module of claim 4, wherein the lens does not contact the lens barrel in the optical axis direction and a direction perpendicular to the optical axis direction.

7. The lens module of claim 4, wherein the lens does not contact the lens barrel in the optical axis direction, and contacts the lens barrel in a direction perpendicular to the optical axis direction.

8. A lens module comprising:
a lens barrel accommodating a plurality of lenses; and
a lens holder attached to the lens barrel and holding one lens among the plurality of the lenses,
wherein a surface of the one lens held in the lens holder faces an upper surface of the lens barrel in an optical axis direction, and
wherein pressure applied to the surface of the one lens facing the upper surface of the lens barrel in the optical axis direction is less than pressure applied to a surface of the one lens contacting the lens holder.

9. The lens module of claim 8, wherein the one lens is disposed to be closest to an object side among the plurality of the lenses.

10. The lens module of claim 8, wherein the one lens held in the lens holder does not contact the lens barrel in the optical axis direction, and is coupled to another lens adjacent thereto.

11. The lens module of claim 8, wherein the one lens held in the lens holder is inserted into the lens barrel in a state in which the one lens is movable relatively.

12. The lens module of claim 8, wherein the one lens held in the lens holder is fixed in a state in which an optical axis of the one lens is aligned with optical axes of the other lenses.

13. A lens module comprising:
a lens barrel, in which a plurality of lenses are disposed, exposing an edge of one lens among the plurality of the lenses to an outside of the lens barrel; and
a lens holder attached to the lens barrel and supporting the edge of the one lens exposed to the outside,
wherein a surface of the one lens supported by the lens holder is in a state of not being confined to an upper surface of the lens barrel, facing the surface of the one lens in an optical axis direction.

14. The lens module of claim 13, wherein the one lens is disposed to be closest to an object side among the plurality of the lenses.

15. The lens module of claim 13, wherein the one lens supported by the lens holder is moved relatively, together with the lens holder, and is fixed in a position in which optical axes of the lenses are aligned with each other.

16. The lens module of claim 13, wherein the lens barrel has one or more openings formed in one or more positions corresponding to the edge of the one lens and penetrating the lens barrel.

17. The lens module of claim 16, wherein the lens holder has one or more support parts inserted into the openings to support the edge of the one lens exposed to the outside of the lens barrel.

18. The lens module of claim 17, wherein the support parts protrude from a surface of the lens holder toward the edge of the one lens exposed to the outside of the lens barrel.

19. The lens module of claim 18, wherein the support parts are symmetrically disposed based on the optical axis.

20. The lens module of claim 19, wherein the support part comprises a flat surface contacting the edge of the one lens exposed to the outside of the lens barrel.

21. The lens module of claim 19, wherein the support part comprises a curved surface contacting the edge of the one lens exposed to the outside of the lens barrel.

22. The lens module of claim 17, wherein the edge of the one lens exposed to the outside of the lens barrel contacts the support parts and does not contact or partially contacts an inner surface of the lens barrel, in a direction perpendicular to the optical axis direction.

23. The lens module of claim 13, wherein the lens barrel comprises a step part formed on an outer surface of the lens barrel, and the lens holder is seated on the step part.

24. The lens module of claim 13, further comprising a cover part covering the edge of the lens exposed to the outside of the lens barrel.

25. The lens module of claim 13, wherein the lens barrel has an incident hole so that external light is incident to the lenses.

26. A method of manufacturing a lens module, comprising:
    disposing a plurality of lenses in a single direction within a lens barrel;
    attaching a lens holder to the lens barrel to couple to one lens among the plurality of the lenses;
    moving the lens holder simultaneously with the one lens to a position at which optical axes of the lenses are aligned with each other; and
    fixing a position of the lens holder.

27. The method of claim 26, wherein the one lens is disposed to be closest to an object side among the plurality of the lenses.

28. The method of claim 26, wherein the disposing of the lenses comprises disposing a surface of the one lens supported by the lens holder in a stress-free state with respect to an upper surface of the lens barrel facing the surface of the one lens in an optical axis direction.

29. The method of claim 26, wherein the disposing of the lenses comprises inserting the one lens into the lens barrel to be movable relatively in the lens barrel.

30. The method of claim 26, wherein in the attaching of the lens holder to the lens barrel, the lens holder supports an edge of the one lens.

31. The method of claim 26, wherein in the moving, the lens holder is movable relative to the lens barrel.

32. The method of claim 26, wherein in the moving, the lens holder is slidable with respect to the lens barrel.

33. The method of claim 26, further comprising, after the attaching of the lens holder to the lens barrel, applying an adhesive onto a contact surface between the lens holder and the lens barrel.

34. The method of claim 33, wherein the fixing comprising hardening the adhesive.

35. A camera module comprising:
    the lens module of claim 1;
    a housing accommodating the lens module;
    a case coupled to the housing to enclose an outer surface of the housing;
    a substrate coupled to a lower portion of the housing; and
    an image sensor mounted on the substrate.

36. A lens module comprising:
    a lens barrel comprising:
        lenses disposed therein; and
        one or more openings peripherally disposed on the lens barrel to expose a partial edge surface of at least one of the lenses to an outside of the lens barrel; and
    a lens holder attached to the lens barrel and coupled to the one lens through the openings.

37. The lens module of claim 36, wherein the one lens is fixed to the lens holder.

38. The lens module of claim 37, wherein the lens holder is fixed to the lens barrel.

39. The lens module of claim 36, wherein the one lens and the lens barrel are spaced apart each other in an optical axis direction.

40. The lens module of claim 36, wherein the lens holder comprises one or more support parts protruding from a surface of the lens holder to be inserted into the openings and coupled to the one lens.

41. The lens module of claim 36, further comprising a cover covering the exposed partial surface of the one lens.

* * * * *